United States Patent [19]

Rumpel

[11] Patent Number: 4,848,788
[45] Date of Patent: Jul. 18, 1989

[54] INDEPENDENT REAR WHEEL SUSPENSION WITH OFFSET CONNECTION BETWEEN UPPER CONTROL ARM AND WHEEL CARRIER

[75] Inventor: Manfred Rumpel, Birmingham, Mich.

[73] Assignee: Ford Motor Company, Dearborn, Mich.

[21] Appl. No.: 671,644

[22] Filed: Nov. 15, 1984

[51] Int. Cl.⁴ .............................................. B60G 3/00
[52] U.S. Cl. .................................. 280/701; 280/675; 280/717; 267/292
[58] Field of Search ............... 280/701, 716, 717, 675; 267/63 R, 57.1 R, 292

[56] References Cited

U.S. PATENT DOCUMENTS

| | | | |
|---|---|---|---|
| 3,189,118 | 6/1965 | Arning | 180/73.1 |
| 3,327,803 | 12/1964 | Cote et al. | 180/55 |
| 3,888,472 | 6/1975 | Hofmann | 267/63 R |
| 4,245,853 | 1/1981 | Inoue et al. | 280/701 |
| 4,269,432 | 5/1981 | Inoue et al. | 280/690 |
| 4,444,415 | 4/1984 | von der Ohe | 280/701 |
| 4,457,537 | 6/1984 | von der Ohe et al. | 280/675 |

OTHER PUBLICATIONS

Tempo/Topaz Shop Manual, p. 14-32-1, undated.

*Primary Examiner*—Kenneth R. Rice
*Attorney, Agent, or Firm*—Jerome R. Drouillard; Roger L. May

[57] ABSTRACT

An independent rear wheel suspension for a motor vehicle having front wheel drive includes upper and lower transverse control arms pivotally mounted to the wheel support member. The wheel support member includes a spindle for mounting a road wheel. The upper control arm is mounted to the wheel support member at a position forward of the spindle. The lower control arm has a bifurcated outboard end with each bifurcation housing a bushing attaching the control arm to the wheel carrier. The suspension also includes a spring member, a longitudinal strut and a telescoping shock absorber.

2 Claims, 2 Drawing Sheets

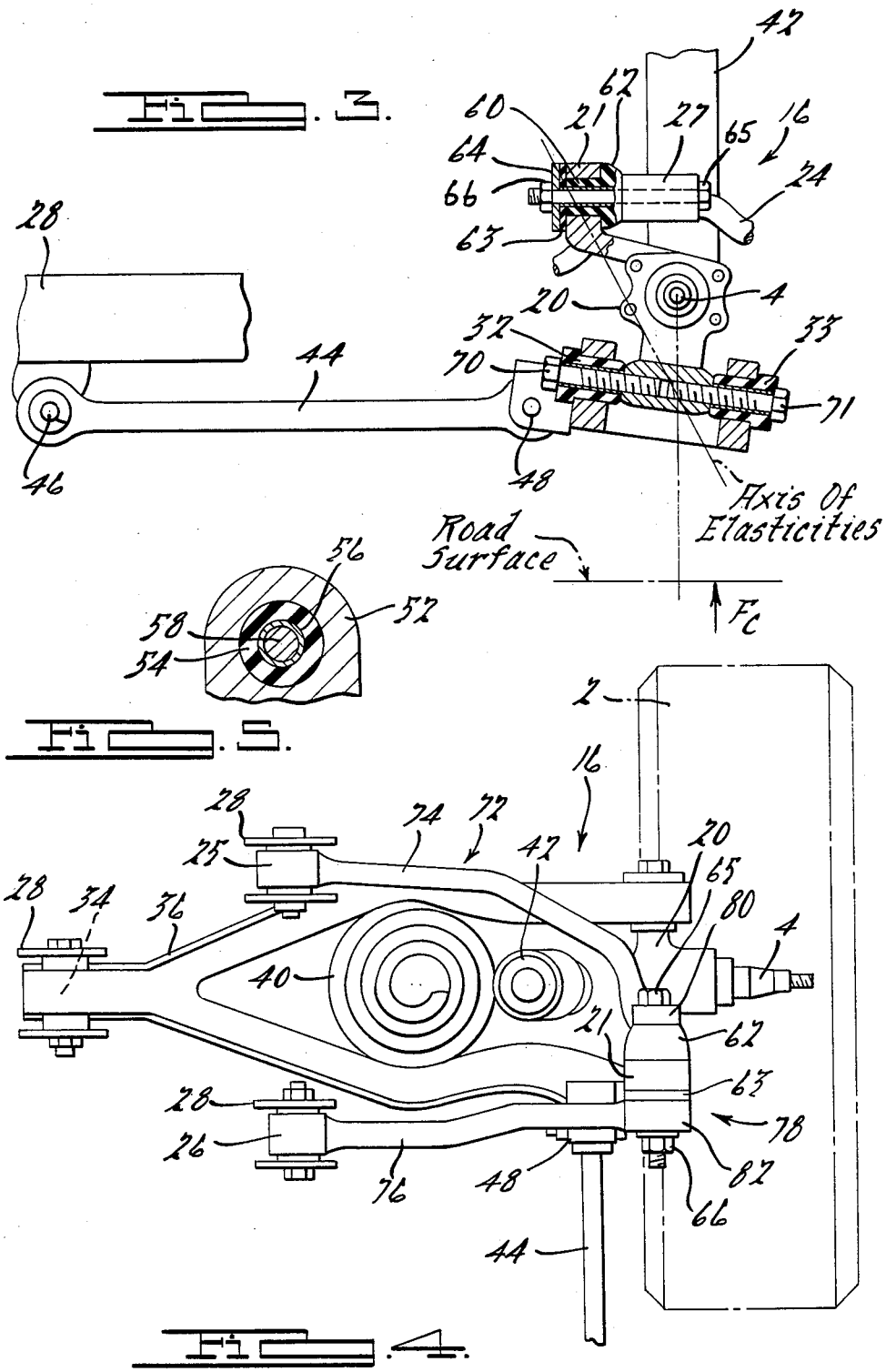

INDEPENDENT REAR WHEEL SUSPENSION WITH OFFSET CONNECTION BETWEEN UPPER CONTROL ARM AND WHEEL CARRIER

BACKGROUND OF THE INVENTION

1. Field of the Invention

This invention relates generally to independent wheel suspension systems for motor vehicles and more particularly to a short-long arm type independent rear suspension for motor vehicles.

2. Disclosure Information

The desirability of roll understeer has long been recognized and a variety of suspension designs have been produced with the roll understeer characteristic in mind. U.S. Pat. No. 3,189,118 to Arning discloses a system in which roll understeer results from convergence of the axes included between a lower control arm and the frame and wheel carrier. U.S. Pat. No. 3,327,803 to Cote et al discloses a suspension employing two pairs of transverse tie rods combined with longitudinal lower arms. U.S. Pat. Nos. 4,245,853 and 4,269,432 to Inoue et al disclose suspension systems for controlling toe in during cornering by the use of converging independent lower control arms in combination with a longitudinal tension strut. U.S. Pat. No. 4,444,415 to von der Ohe discloses a suspension system in which each rear wheel carrier is guided by five separate articulated links. Finally, U.S. Pat. No. 4,457,537 to von der Ohe et al discloses a suspension with a transverse, laterally offset track rod and upper and lower transverse wishbone arms articulated at a single point to the wheel carrier. Each of these systems produces roll understeer by causing the wheel at the outside of a turn to toe in. The present invention accomplishes this in a suspension system having very favorable space requirements.

SUMMARY OF THE INVENTION

In accordance with the present invention, an independent suspension for a vehicle comprises: a wheel carrier having a spindle for mounting a wheel and tire assembly; a transverse lower control arm pivotally attached to the chassis of said vehicle at its inboard end and having a bifurcated outboard end pivotally attached to the wheel carrier at a first location longitudinally forward of the spindle and at a second location longitudinally rearward of the spindle; and a transverse upper control arm pivotally attached to the chassis at its inboard end and pivotally attached at its outboard end to the wheel carrier at a location longitudinally forward of the spindle such that the axis of elasticities responsive to cornering force intersects the road surface upon which the motor vehicle is traveling at a position longitudinally rearward of the point at which cornering force is normally applied upon said wheel and tire assembly.

The suspension according to the present invention provides for increased cargo space because unlike systems employing MacPherson struts, a large tower is not needed to house shock absorber and spring components. The present invention is further advantageous in that beneficial toe in of the outside wheel is achieved during turning maneuvers and camber and track width changes during jounce and rebound are minimized. Control of toe in during cornering results from placement of the upper control arm's connection to the wheel carrier forward of the spindle such that the axis of elasticities responsive to cornering force contacts the road surface at a point trailing the location at which cornering force normally acts upon the wheel.

BRIEF DESCRIPTION OF THE DRAWINGS

Reference is now made to the accompanying drawings in which:

FIG. 3 is a side elevation of the suspension shown in FIGS. 1 and 2.

FIG. 4 is a plan view of an alternate embodiment of the suspension shown in FIGS. 1-3.

FIG. 5 is a cross sectional view of the several suspension bushings shown in FIGS. 1-4.

DETAILED DESCRIPTION OF THE INVENTION

Figure 1:
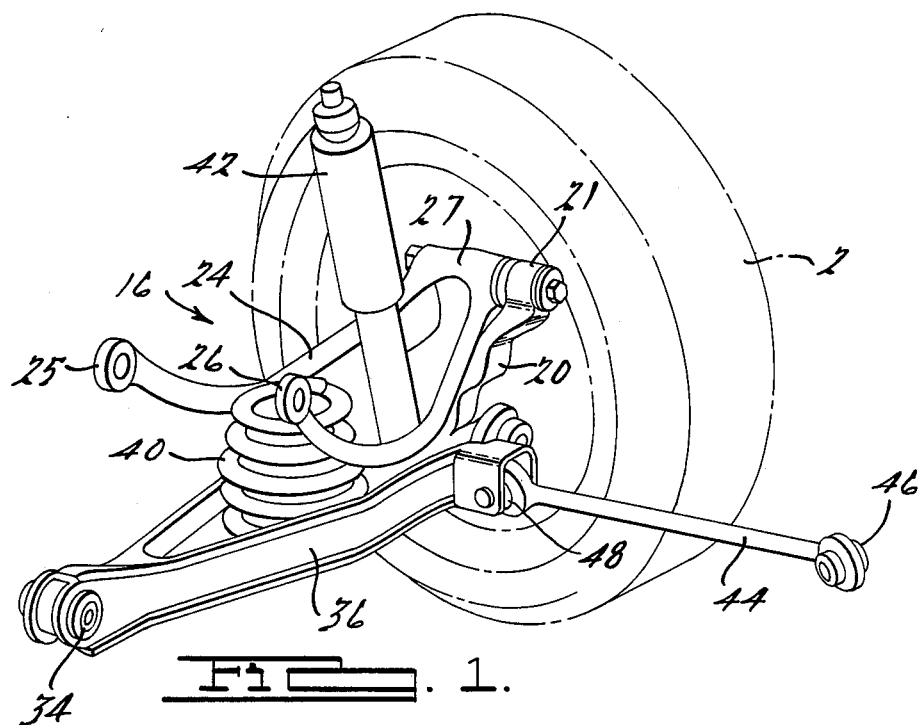
FIG. 1 is a perspective view of a left rear independent suspension according to this invention.
Figure 2:
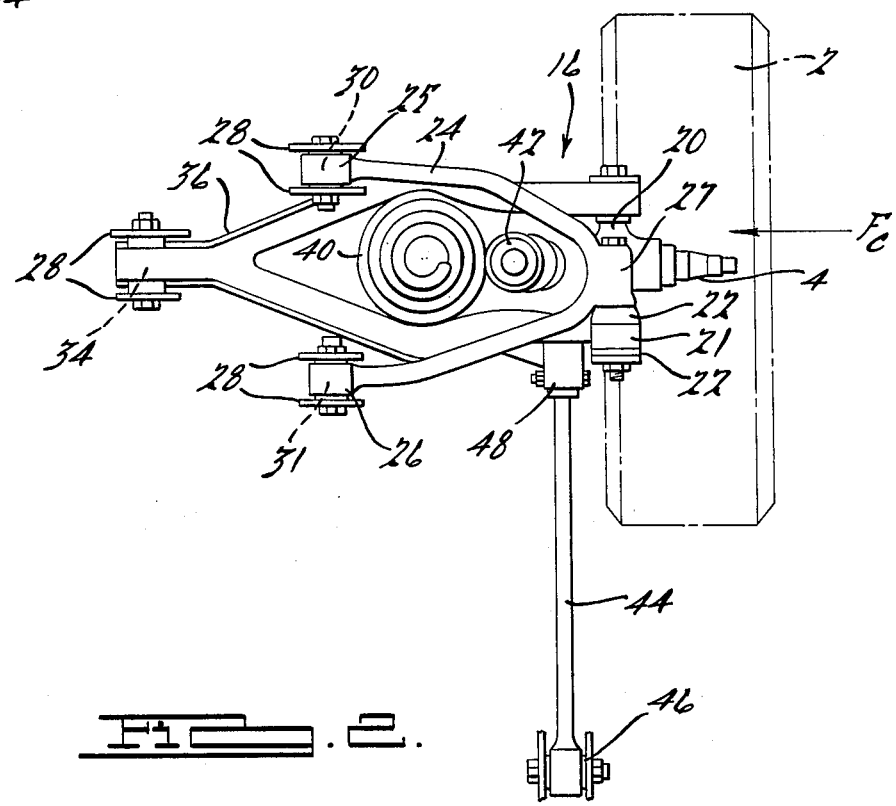
FIG. 2 is a plan view of the left rear suspension shown in FIG. 1.

Generally, as shown in FIGS. 1-3, wheel suspension 16 comprises wheel carrier 20 having spindle 4 upon which wheel and tire assembly 2 is mounted, transverse upper control arm 24 and transverse lower control arm 36. Upper control arm 24 is oriented transversely to the vehicle centerline and is pivotally mounted to the chassis at its inboard ends 25 and 26.

As shown in FIG. 2, ends 25 and 26 of upper control arm 24 are attached to the chassis 28 by means of bolts extending through resilient bushing assemblies 30 and 31 mounted in ends 25 and 26 respectively. Each inboard mounting position of upper control arm 24 is preferably equidistant from the vehicle's longitudinal centerline.

The general construction of bushings 30 and 31 as well as the construction of lower control arm bushings 32, 33 and 34, and longitudinal strut bushings 46 and 48, is shown in FIG. 5. Referring now to FIG. 5, each bushing assembly has a flanged outer sleeve 52 which is coaxial with and surrounds a cylindrical elastomeric bushing 54. Inner sleeve 56 is mounted concentrically within cylindrical elastomeric bushing 54 which may be of natural rubber or other rubber compounds. Finally, bolt 58 is slidably engaged with inner sleeve 56 to permit mounting and dismounting of each bushing assembly.

Upper control arm 24 is pivotally attached at its outboard end 27 to boss 21, which is integral with wheel carrier 20, by means of bushing assembly 22 which is mounted within boss 21. As shown in FIG. 3, bushing assembly 22 comprises an elastomeric element having a cylindrical section 60 within a cylindrical bore formed within boss 21, a frustroconical section 62 extending from said bore and an annular section 63 clamped between washer 64 and boss 21.

Bushing assembly 22, boss 21 and end 27 of control arm 24 are clamped together by bolt 65 and nut 66.

Frustroconical section 62 and annular section 63 of bushing assembly 22 cause bushing assembly 22 to have an asymmetric response to forces tending to rotate wheel carrier 20 in a vertical plane. Thus, when roadwheel and tire assembly 2 strike an obstruction in the roadway. spindle 4 will be subjected to a force acting in the rearward direction. This force will cause wheel carrier 20 to rotate rearward to the extent permitted by frustoconical section 62, which will be compressed between boss 21 and outer end 27 of the upper control arm.

During braking, annular section 63 will control rotation of wheel carrier 20 in a forward direction. As wheel carrier 20 rotates forward in response to braking torque, annular section 63 will be compressed between boss 21 and washer 64. The asymmetric response characteristic of bushing assembly 22 thus results from the fact that frustoconical section 62 is relatively more yielding to force acting in an axial direction than is annular section 63.

As shown with particularity in FIG. 3, lower control arm 36 has a bifurcated outboard end pivotally attached to wheel carrier 20 at first and second locations, which are longitudinally forward and rearward of spindle 4, by means of bushing assemblies 32 and 33. Bolts 70 and 71, which are threadably engaged with wheel carrier 20, clamp bushing assemblies 32 and 33 to wheel carrier 20. As shown in FIGS. 1 and 2, lower control arm 36 is pivotally attached to chassis 28 by means of bushing assembly 34.

Spring 40 and shock absorber 42 are conventionally mounted between lower control arm 36 and chassis 28. Finally, longitudinal strut 44 is pivotally mounted to chassis 28 by bushing assembly 46 at its leading end and pivotally mounted at its trailing end to lower control arm 36 by bushing assembly 48. In accord with conventional practice a transverse stabilizer bar (not shown) may be provided with such bar pivotally mounted to the chassis and resiliently mounted to the lower control arms.

An alternate preferred embodiment of the present invention is shown in FIG. 4. A multi-piece upper control arm assembly 72 comprises a first or trailing arm element 74, a second, or leading arm element 76, and central bushing assembly 78. Both arm elements are rigidly attached to the central bushing assembly at their outboard ends 80 and 82. Central bushing assembly 78 is similar in construction to bushing assembly 22 inasmuch as both contain a frustoconical section which resiliently allows limited rearward rotation of wheel carrier 20 in a vertical plane during wheel recession and annular section 63 which resiliently resists forward rotation of wheel carrier 20 in a vertical plane during brake operation. Outer ends 80 and 82 of the first and second arm elements are rigidly clamped to bushing assembly 78 by bolt 65 and nut 66. FIG. 5 shows the cross-sectional construction of bushing assembly 78. Multi-piece control arm 72 is the subject of a copending U.S. patent application Ser. No. 671,833, entitled "Multi-Piece Automotive Suspension Control Arm" and filed concurrently herewith.

The previously described toe angle control during cornering maneuvers will now be described in detail. As shown in FIG. 3, if one constructs the axis of elasticities linking the center of bushing assembly 22 and the midpoint of a straight line connecting the lower control arm attaching bushings 32 and 33, the intersection of this axis of elasticities with the road surface will lie rearward of the location at which cornering force normally acts upon the tire and wheel assembly. This occurs because upper control arm 24 is attached to wheel carrier 20 at boss 21, which is longitudinally forward of spindle 4. As shown in FIGS. 2 and 3, cornering force $F_C$ acts normally upon wheel and tire assembly 2 at a position trailing spindle 4. This could cause road wheel and tire assembly 12 to toe out during cornering maneuvers but for the fact that in accordance with the suspension of this invention the axis of elasticities intersects the road surface at a point which is longitudinally rearward of the point at which cornering force $F_C$ is normally applied to wheel and tire assembly 2. In other words, cornering force $F_C$ acts forward of the intersection of the axis of elasticities with the road surface. Because wheel carrier 20 will pivot about the axis of the elasticities, cornering force $F_C$ causes wheel and tire assembly 2 to toe in, thereby producing the beneficial understeering effect sought. The axis of elasticities described herein may therefore be termed "the axis of elasticities responsive to cornering force".

An additional advantage offered by the present invention arises from the upward-opening concave or arcuate shape of the upper control arm. As shown in FIG. 1, this configuration produces additional vertical clearance above the middle span of each arm element. This additional clearance will permit a longitudinal frame rail of the type shown, for example, in Ford Motor Company 1984 Model Shop Manual for Tempo/Topaz, Escort/Lynx, EXP, P. 14-32-1, to pass over the upper control arm, while allowing generous suspension jounce travel. Yet another advantage of the present invention arises from placement of the suspension spring between the lower control arm and the vehicle body or chassis. In some other designs the spring is placed about the shock absorber—i.e., in the classical MacPherson strut, but such placement of the spring causes an intrusion into the vehicle's passenger compartment.

Variations and modifications of the present invention are possible without departing from the spirit and scope as defined by the appended claims.

The term "chassis" when used in the specification and claims, will be understood to refer to either a conventional vehicle chassis or a conventional unitary chassis and body construction, and is intended to include vehicle structure and components connected to or supported upon the chassis structure and forming part of the sprung portion of the vehicle.

The embodiments in which an exclusive property or privilege is claimed are defined as follows:

1. An independent suspension for a vehicle comprising:
   a wheel carrier having a spindle for mounting a wheel;
   a transverse lower control arm pivotally attached to the chassis of said vehicle at a single location at its inboard end and pivotally attached at its outboard end to said wheel carrier at a first location longitudinally forward of said spindle and a second location longitudinally rearward of said spindle;
   a telescopic shock absorber attached to said chassis at its upper end and attached at its lower end to said lower control arm;
   a load carrying device mounted between said chassis and said lower control arm;
   a longitudinal strut pivotally attached at its leading end to said chassis and at its trailing end to said lower control arm; and
   a transverse upper control arm pivotally attached to said chassis at two locations inboard of said wheel carrier and pivotally attached to said wheel carrier at its outboard end at a position which is longitudinally forward of said spindle such that a straight line passing through the attachment position of said upper control arm to said wheel carrier and bisecting a straight line connecting said first and second locations at which said transverse lower control arm is attached to said wheel carrier, intersects the road surface upon which the motor vehicle is being operated at a point which is rearward of the point at which cornering force normally acts upon the wheel and tire assembly with the result that said cornering force will cause said wheel carrier to pivot about said straight line passing from said upper control arm to said lower control arm so as to urge said wheel and tire assembly in the direction of toe in.

2. The suspension of claim 1 wherein said upper control arm is attached to said wheel carrier by a bushing assembly comprising a first section resiliently permitting rotation of said wheel carrier in a rearward direction in a vertical plane during wheel recession and a second section resiliently resisting rotation of said wheel carrier in forward direction in a vertical plane during brake operation.

* * * * *